United States Patent Office 3,803,255
Patented Apr. 9, 1974

3,803,255
PROCESS FOR PREPARING CUMENE
Alan F. Ellis, Murrysville, Earl F. Harper, Oakmont, and Roger C. Williamson, Allison Park, Pa., assignors to Gulf Research & Development Company, Pittsburgh, Pa.
No Drawing. Filed June 4, 1973, Ser. No. 366,862
Int. Cl. C07c 3/54
U.S. Cl. 260—671 P    11 Claims

ABSTRACT OF THE DISCLOSURE

A process for preparing increased production of cumene of low acid wash color which involves passing benzene and propylene through a bed of phosphoric acid catalyst and then through a bed of silica-alumina.

---

This invention relates to an improvement in a process wherein cumene is prepared by passing benzene and propylene through a bed composed of phosphoric acid catalyst. The effluent from such reaction normally has a high acid wash color. Acid wash color, as measured by ASTM D-848, is a measure of functional impurities, such as olefins and oxygenated compounds in the product.

Cumene is the starting material for the manufacture of phenol and for such use manufacturers have strict standards limiting the acid wash color that can be tolerated without adversely effecting the quality of the product phenol. In the past, it has been customary in meeting cumene specifications for acid wash color for the manufacturer to either cut back on the cumene production or replace the phosphoric acid catalyst frequently.

We have found that in the process wherein benzene is reacted with propylene by passage through a bed of phosphoric acid catalyst to obtain cumene, a cumene product of reduced acid wash color is obtained by passage of the effluent therefrom through a bed of silica-alumina. This allows the process to be operated at a higher cumene production rate. In addition, we have noted that the catalyst lifetime is increased.

The reaction of benzene with propylene to obtain cumene in the presence of a phosphoric acid catalyst is effected according to conventional means. The phosphoric acid catalyst used is composed of a solid support, such as kieselguhr, wherein the phosphoric acid comprises from about five to about 30 weight percent of the total catalyst. Cumene is obtained, for example, by passing benzene and propylene in a molar ratio of about 3:1 to about 14:1, preferably about 6:1 to about 8:1, through a bed of said phosphoric acid catalyst at a weight hourly spaced velocity (combined weight of benzene and propylene per weight of catalyst per hour) of about 0.1 to about 10, preferably about 1 to about 3, a temperature of about 177° to about 371° C., preferably about 210° to about 250° C., and a pressure of about 400 to about 700 pounds per square inch gauge (about 28 to about 49 kilograms per square centimeter), preferably about 485 to about 535 pounds per square inch gauge (about 34 to about 37.5 kilograms per square centimeter). The product will contain cumene, unreacted benzene and, in some cases, some di-, tri- and tetraisopropyl benzenes.

In accordance with the proposal herein, the effluent from the above reaction is then passed through a bed of silica-alumina. Any silica-alumina, amorphous or crystalline, can be used. In general, the silica alumina will contain from about three to about 60 weight percent, preferably from about 10 to about 30 weight percent alumina as $Al_2O_3$, with substantially all of the remainder being silica as $SiO_2$. Silica-alumina that can be used can have a surface area of about 50 to about 600 square meters per gram, preferably about 200 to about 600 square meters per gram and an average pore diameter of about 6.0 to about 100 A., preferably from about 10 to about 90 A. A useful crystalline silica-alumina that can be used herein is defined, for example, in U.S. Pat. No. 3,385,906 to Kaufman, as a crystalline zeolitic molecular sieve, for example, natural or synthetic hydrated metal aluminosilicates, consisting basically of an open, three-dimensioned framework having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc. and/or ammonium or hydrogen. A particularly effective zeolite is zeolite Y such as defined in U.S. Pat. No. 3,130,007. An example of zeolite Y will fall within the following chemical composition:

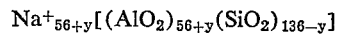

$$Na^+{}_{56+y}[(AlO_2)_{56+y}(SiO_2)_{136-y}]$$

wherein $y$ generally has a value of about 0, but can vary from $-8$ to $+20$. Generally, on a weight bases, the silica alumina will amount to about five to about 20 weight percent, preferably from about 10 to about 15 weight percent, based on the phosphoric acid catalyst.

Accordingly, the effluent from the phosphoric acid catalyst bed is then passed through the bed of silica-alumina at a weight hourly spaced velocity (weight of effluent per weight of catalyst per hour) of about 1 to about 100, preferably about 10 to about 30, at a temperature of about 177° to about 371° C., preferably about 210° to about 250° C. and a pressure of about 200 to about 700 pounds per square inch gauge (about 14 to about 49 kilograms per square centimeter), preferably about 300 to about 550 pounds per square inch gauge (about 21 to about 38.5 kilograms per square centimeter). Little further alkylation occurs as a result of such treatment, for essentially all of the propylene, the limiting reactant, has been reacted with benzene in the presence of the phosphoric acid catalyst. After treatment with silica-alumina, the individual components in the reaction mixture, for example, unreacted benzene, cumene and the defined polyalkyl benzenes, if present, can be recovered from the reaction product by simple distillation techniques.

The process of this invention can further be illustrated by the following examples. In these examples, the acid wash color of the raw alkylate from the reactor was used as a measure of improvement. It was felt that this improvement would result in better acid wash colors in the distilled cumene. The reactor used in each example consisted of an iron pipe 52 inches long having an inner diameter of 0.622 inch equipped with an outer jacket 50 inches long and an inner diameter of three inches filled with dixylylethane (DXE) as a heat transfer medium. Heat was supplied to the DXE with a calrod electric heater and controlled by a thermoelectric controller. A thermowell extended coaxially through the reactor. The temperature in the reactor was measured by thermocouples evenly spaced therethrough. The pressure was controlled by means of a pressure control valve in the effluent line. The reaction product was passed to a gas-liquid separator and the gas was measured by a wet test meter and analyzed by mass spectroscopy. The liquid recovered was weighed and analyzed for acid wash color (ASTM D-848). Feed to the reactor was pumped therein upwardly through the phosphoric acid catalyst bed and then through the silica-alumina by an adjustable stroke metering pump from a calibrated feed tank. Feed to the reactor contained benzene and propylene in a molar ratio of 7.93:1 and was obtained from a pressure tank containing 29.63 pounds of benzene and 2.52 pounds of a propane-propylene mixture. The propane-propylene mixture had the following composition:

| Component: | Weight percent |
|---|---|
| Ethane | 0.83 |
| Propane | 19.29 |
| Propylene | 79.88 |

To help maintain the propane-propylene mixture in solution, the vessel was pressured to 200 pounds per square inch gauge (14 kilograms per square inch gauge) with nitrogen.

EXAMPLE I

To the reactor defined above, there was added 50 milliliters of glass beads having a diameter of 4.0 millimeters, which provided a preheat section 12 inches in length. There was then added 50 milliliters (45.3 grams) of solid phosphoric acid catalyst crushed to 10 to 20 mesh. The catalyst was composed of phosphoric acid on kieselguhr, of which about nine weight percent was phosphoric acid, having a bulk density of 56.2 pounds per cubic foot (0.9 gram per cubic centimeter). The resultant phosphoric acid bed was 12⅞ inches in depth. The remainder of the reactor was filled with glass beads similar to those used in the preheat section. The alkylation reaction was carried out at a temperature of 232° C., a presure of 500 pounds per square inch gauge (35.16 kilograms per square centimeter) and a liquid weight hourly space velocity (LWHSV) of 4.78 (4.78 grams of feed, benzene and propylene, per gram of catalyst charged). The reaction was operated until conditions were stabilized and then an onstream period of three hours was made. The liquid product was weighed, analyzed for conversion by gas-liquid chromatography and the acid wash color determined. The total alkylation product was found to have an acid wash color of 9−.

EXAMPLE II

The run of Example I was repeated, except a portion of the glass beads immediately above the phosphoric acid catalyst was replaced with 5.0 grams (9.94 weight percent based on the phosphoric acid catalyst) of silica-alumina to provide a depth thereof of 2⅜ inches. The silica alumina used is defined as Silica Alumina Triple A (American Cyanamid) composed of 28.7 weight percent alumina as $Al_2O_3$ having a surface area of 540 square meters per gram, a pore volume of 0.87 and an average pore diameter of 64 A. The feed was passed upwardly through the phosphoric acid catalyst and the effluent therefrom upwardly through the silica-alumina. The product obtained had an acid wash color of 4.

EXAMPLE III

The run of Example II was repeated, except that 5.0 grams (11.26 weight percent based on the phosphoric acid catalyst) of a Houdry silica-alumina, 3CP–15, was used as the silica-alumina bed. The silica-alumina contained 44.99 weight percent $Al_2O_3$ and had a surface area of 90 to 100 square meters per gram. The bed was two inches in depth. The product was found to have an acid wash color of 4.

EXAMPLE IV

The run of Example II was again repeated, except that 5.0 grams (11.21 weight percent based on the phosphoric acid catalyst) of a Houdry silica-alumina, 159CP–71, was used as the silica-alumina bed. The silica-alumina contained 12.4 weight percent $Al_2O_3$ and had a surface area of 290 to 315 square meters per gram, a pore volume of 0.57 and an average pore diameter of 82 A. The bed was two inches in depth. The product obtained had an acid wash color of 4+.

EXAMPLE V

The run of Example II was further repeated, except that 5.0 grams (10.96 weight percent based on the phosphoric acid catalyst) of a Davison silica-alumina (Davison 979) was used as the silica-alumina bed. The silica-alumina contained 13.79 weight percent $Al_2O_3$ and had a surface area of 397 to 410 square meters per gram, a pore volume of 0.80 and an average pore diameter of 78 A. The bed was two inches in depth. The product obtained had an acid wash color of 3−.

EXAMPLE VI

The run of Example II was again repeated, except that 5.0 grams (10.89 weight percent based on the phosphoric acid catalyst) of Filtrol silica-alumina (Filtrol 62) was used as the silica-alumina bed. The silica-alumina contained 17.5 weight percent alumina as $Al_2O_3$ and had a surface area of 280 to 300 square meters per gram and an average pore diameter of 50 A. The bed was 1⅞ inches in depth. The liquid product obtained had an acid wash color of 3−.

The above clearly discloses the advantages of operation in accordance with the procedure defined and claimed herein. In each of the above examples, reaction of all the propylene with benzene to form cumene was noted. Note, however, that in Example I wherein the reactants were passed solely through a phosphoric acid catalyst bed, the total reaction product had an acid wash color of 9−. As Examples II to VI show, when the total effluent was also passed through a silica-alumina bed, the acid wash color was reduced to a range of 4+ to 3−.

We have found in commercial operations wherein benzene is reacted with propylene in the presence of a solid phosphoric acid catalyst to obtain cumene, the distilled cumene product will normally have an acid wash color of from 2 to 3 at the beginning of the operation. However, as the catalyst ages, the acid wash color increases so that it becomes necessary to reduce the flow of feed to the reactor, resulting in a loss of cumene production. When some minimum desired rate can no longer be obtained, the catalyst is discharged and replaced with new catalysts.

We have scaled up the operation defined in Example VI and have used the same in a commercial operation. When the reactants were passed solely through a phosphoric acid catalyst bed, the average cumene production amounted to 3565 barrels per day. Under identical operating conditions, but by passing the total effluent through the silica-alumina bed, the average production was raised to 3896 barrels per day, an increase of about 9.2 volume percent. This combined catalyst was removed at about the normal cycle time but at a production rate of 300 barrels per day above the typical finel level. This indicates that the catalyst life could have been extended if the operation had continued to this typical minimum production level.

Obviously, many modifications and variations of the invention, as hereinabove set forth, can be made without departing from the spirit and scope thereof, and, therefore, only such limitations should be imposed as are indicated in the appended claims.

We claim:

1. In a process for preparing cumene wherein benzene and propylene are passed through a phosphoric acid catalyst bed, improving the acid wash color of the product resulting from such reaction which comprises passing the effluent from such reaction through a bed of silica-alumina.

2. The process of claim 1 wherein the reaction temperature of the phosphoric acid catalyst bed is in the range of about 177° to about 371° C.

3. The process of claim 1 wherein the reaction temperature of the phosphoric acid catalyst bed is in the range of about 210° to about 250° C.

4. The process of claim 1 wherein the temperature in the silica-alumina bed is in the range of about 177° to about 371° C.

5. The process of claim 1 wherein the temperature in the silica-alumina bed is in the range of about 210° to about 250° C.

6. The process of claim 1 wherein the silica-alumina bed is from about five to about 20 weight percent based on said phosphoric acid catalyst bed.

7. The process of claim 1 wherein the silica-alumina bed is from about 10 to about 15 weight percent based on said phosphoric acid catalyst bed.

8. The process of claim 1 wherein said silica-alumina has a surface area of about 50 to about 600 square meters per gram and an average pore diameter of about 6 to about 100 A.

9. The process of claim 1 wherein said silica-alumina has a surface area of about 200 to about 600 square meters per gram and an average pore diameter of about 10 to about 90 A.

10. The process of claim 1 wherein the molar ratio of benzene to propylene in the feed is about 3:1 to about 14:1.

11. The process of claim 1 wherein the molar ratio of benzene to propylene in the feed is about 6:1 to about 8:1.

References Cited
UNITED STATES PATENTS

| | | | |
|---|---|---|---|
| 2,431,515 | 11/1947 | Shepardson | 260—671 P |
| 2,695,324 | 11/1954 | Langlois | 260—671 P |
| 3,510,534 | 5/1970 | Sulzbach | 260—671 R |
| 3,520,945 | 7/1970 | DeGraff | 260—671 R |
| 3,527,823 | 9/1970 | Jones | 260—671 P |

CURTIS R. DAVIS, Primary Examiner

U.S. Cl. X.R.

260—671 R